United States Patent
Ruta et al.

[11] Patent Number: 5,916,533
[45] Date of Patent: Jun. 29, 1999

[54] APPARATUS AND METHOD FOR THE CONTROLLED APPLICATION OF SOLUBLE CHEMICALS TO A BODY OF WATER

[75] Inventors: Vincent Ruta, Waldwick; Stefano Martino, Jr., Hackensack; Norval W. Wilson, Dumont, all of N.J.

[73] Assignee: United Water New Jersey Inc., Harrington Park, N.J.

[21] Appl. No.: 08/950,061

[22] Filed: Oct. 14, 1997

[51] Int. Cl.[6] .................................................. B01D 11/02
[52] U.S. Cl. ......................... 422/265; 422/266; 422/268; 422/275; 422/277; 210/169; 210/198.1; 210/242.1
[58] Field of Search ................................ 422/264, 264 B, 422/265, 266, 268, 275, 276, 277; 4/222, 488, 490; 210/169, 198.1, 241, 242.1

[56] References Cited

U.S. PATENT DOCUMENTS

| | | |
|---|---|---|
| 990,369 | 4/1911 | Metten . |
| 2,086,937 | 7/1937 | Harborne . |
| 2,169,941 | 8/1939 | Campbell . |
| 2,203,565 | 6/1940 | Field . |
| 2,485,684 | 10/1949 | Aldredge, Sr. . |
| 3,483,989 | 12/1969 | Gopstein . |
| 3,495,948 | 2/1970 | Long et al. . |
| 4,119,019 | 10/1978 | Reid .................................... 422/277 X |
| 4,181,702 | 1/1980 | Watson ................................. 422/277 X |
| 4,218,843 | 8/1980 | Clarke, Jr. . |
| 4,582,015 | 4/1986 | Hunter . |
| 4,747,362 | 5/1988 | Olsen et al. . |
| 4,798,707 | 1/1989 | Thomas et al. ....................... 422/265 X |
| 5,011,602 | 4/1991 | Totani et al. . |
| 5,053,205 | 10/1991 | Taylor et al. ............................ 422/265 |
| 5,106,492 | 4/1992 | Distinti et al. . |
| 5,476,116 | 12/1995 | Price et al. . |
| 5,702,614 | 12/1997 | Taylor .................................. 422/265 X |

Primary Examiner—Elizabeth McKane
Attorney, Agent, or Firm—Lerner, David, Littenberg, Krumholz & Mentlik, LLP

[57] ABSTRACT

A dispensing container for the controlled dispensing of chemicals in the treatment of a body of water to prevent growth of algae and other adverse conditions includes walls defining a storage compartment for the chemicals for treating the body of water, the walls have an inlet for the controlled flow of water from the body of water into the storage compartment and an outlet for controlling the flow of water out of the storage compartment, said storage compartment is open at one end, and a charging assembly is operatively connectable to the open end of the storage compartment for charging chemicals into the storage compartment. Additionally, the combination of the dispensing container as above described with a transport device and a bracket assembly for connecting the dispensing container to the transport device to pass the dispensing container through the body of water to be treated.

14 Claims, 8 Drawing Sheets

APPARATUS AND METHOD FOR THE CONTROLLED APPLICATION OF SOLUBLE CHEMICALS TO A BODY OF WATER

This invention relates generally to the use of soluble chemicals in the treatment of a body of water to overcome adverse conditions, such as the growth of algae or other conditions which affect the nature or potability of such body of water for any of a number of obvious uses which such bodies of water may have, and more particularly to an apparatus and method for passing a chemical such as copper sulfate through the body of water to control, prevent or limit the continuation of the growth or adverse conditions present in the body of water and help to maintain the quality and usability of the body of water.

BACKGROUND OF THE INVENTION

Bodies of water such as reservoirs from which potable water is taken for public and private uses, as well as other bodies of water such as swimming pools or bathing facilities in which humans swim or immerse themselves, often develop adverse conditions such as the growth of algae, accumulation of mosquito larvae, adverse chemical imbalance, the need to prevent the growth of harmful germs, etc., and these conditions require treatment in order to drink, swim-in, bathe or to otherwise use such facilities. Such treatment is generally done by adding predetermined quantities of soluble chemicals to the water in such facilities to arrest or control one or more of such conditions.

In the treatment of mosquito larvae, burlap or the like type of bags or containers are laid in the path of the incoming water, as is shown in U.S. Pat. No. 4,218,843, wherein spaced openings as used to control the dispersion of the chemical for killing such mosquito larvae when they emerge. Other techniques, such as solid state chemical dispensers for regulating the chlorine content in a swimming pool, are also used as is shown in U.S. Pat. Nos. 3,425,348 and 3,483,989. Such solid state dispensers include sized passages or openings to control the flow of water into and out of the solid state dispensers to control the rate at which the chemicals dissolve into the surrounding water in the swimming pool.

This is also illustrated in the case of reservoirs which historically have been treated with predetermined quantities of algaecides such as copper sulfate to control the growth and proliferation of algae. Thus it is known to apply copper sulfate to such reservoirs by utilizing boats for pulling or dragging burlap bags full of copper sulfate crystals through the water in such reservoirs for this purpose.

In the prior art burlap bag techniques for controlling or arresting the growth of algae in reservoirs, analysis has shown that there are difficulties with this procedure. Amongst these is the cost of the labor because of the manpower required to handle the quantities of copper sulfate used; the necessity for using relatively large and expensive copper sulfate crystals because smaller crystals of copper sulfate dissolve too quickly, particularly when burlap bags are moved through relatively warmer water in the reservoir being treated; the limited life and cost for the replacement of the burlap bags or the limited supply and costs for mesh type plastic bags sometimes used in place of such burlap bags; the application time and the time required to clean and reset the equipment for further treatment; and last, the need to comply with the government regulations which pervade the application and use of chemicals in the treatment of any such potable water.

The present invention provides an improved apparatus, device and method for treating adverse conditions in a body of water such as a reservoir for overcoming these problems of the prior art which uses a basket or dispensing container made of a suitable plastic or the like material having the strength and inertness to withstand the rigors for treating the body of water with chemicals which is removably connectable to any suitable means for transporting the basket or dispensing container through the body of water to be treated. The basket or dispensing container includes wall means defining a sized and shaped storage compartment having a charging opening for receiving the soluble chemicals for treating the body of water, a front end wall means on said storage compartment has a predetermined sized and shaped inlet means for controlling the volume and rate of water passing into said storage compartment and an outlet means for water having the chemicals dissolved therein, and means on the front end wall means is operatively associated with the inlet means for opening and closing the inlet means to start and stop the flow of water into said storage compartment.

SUMMARY AND OBJECT OF THE INVENTION

Thus, the present invention covers an improved dispensing container to hold chemicals for controlled solution of the chemicals into a body of water comprising, sized and shaped wall means defining a storage compartment having a charging opening for receiving soluble chemicals to be dissolved into the body of water, said wall means having a predetermined sized inlet for permitting fluid to pass into the storage compartment to control the volume and rate of flow of the water into the storage compartment, and an outlet means to enable water with the dissolved chemicals therein to pass from said storage compartment, and means for starting and stopping the flow of water into said storage compartment means.

The present invention also covers the combination with the dispensing container as above described of transport means, and means for detachably connecting said dispensing container to the transport means to enable said dispensing container to pass through the body of water to be treated.

Accordingly, it is the primary object of the present invention to provide an improved dispensing container for soluble chemicals for treating adverse conditions in a body of water having a storage compartment for the soluble chemicals to be dispensed into the water being treated, a predetermined sized inlet means for passing a predetermined volume of water through said inlet means at a predetermined rate and an outlet means for passing water with the dissolved chemical thereon from the storage compartment, and means for starting and stopping the flow of water through said inlet means into the storage compartment.

It is another object of the present invention to provide an improved dispensing container for soluble chemicals used for treating adverse conditions in a body of water having a storage compartment for the soluble chemicals and wherein inlet means and the outlet means communicating with the storage compartment coact to control the volume and rate of flow of the water passing through the storage compartment.

It is another object of the present invention to provide an improved dispensing container for soluble chemicals used for treating adverse conditions in a body of water having a storage compartment for the soluble chemicals and wherein inlet means and the outlet means for the storage compartment are sized and coact to adjust the dwell time of the water passing through the storage compartment, as a function of the crystalline size of soluble chemicals, to control solution of the chemicals in such water.

It is another object of the present invention to provide an improved dispensing container for soluble chemicals used for treating adverse conditions in a body of water having a storage compartment for the soluble chemicals and an inlet means and outlet means to enable the water being treated to flow through said storage compartment, which dispensing container includes, a baffle assembly to stop and start the flow of water through the inlet means into the storage compartment.

With these and other objects and advantages, the apparatus and method in accordance with the present invention will be better understood from the description and the appended claims which follow below when taken in conjunction with the following drawings.

DESCRIPTION OF A PREFERRED EMBODIMENT

Figure 1:
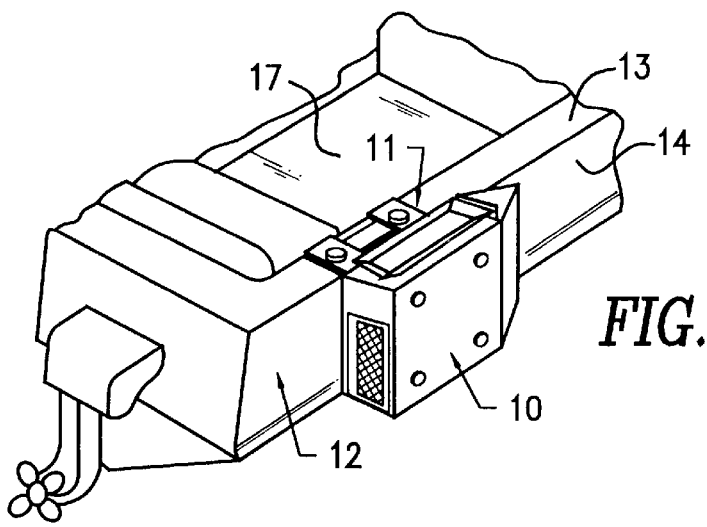
FIG. 1 is a perspective view of a portion of one form of transport means having a dispensing container in accordance with the present invention connected in assembled position for movement through a body of water with the transport means.

Referring to the drawings, FIGS. 1, 2, 3 and 4 show one preferred embodiment of the dispensing container generally designated 10 in accordance with the present invention connected by a suitable bracket assembly 11 to transport means 12 such as a motor propelled boat. While a motor propelled boat 12 is shown as the transport means, this is not intended by way of limitation because any suitable device to which the dispensing container can be connected can be used to drag, pull or push the dispensing container 10 through the body of water, not shown, to be treated without departing from the scope of the present invention. Accordingly, transport means when used in the present application is meant to be used in the broadest sense to cover any such means for accomplishing this purpose.

Similarly, the bracket assembly 11 is also only representative of various types of bracket assemblies and will be sized and shaped depending on the size of the dispensing container 10 and how it is to be connected to the transport means 12 so that it can be dragged, pulled or pushed through the body of water, not shown, to be treated.

Transport means 12 has a side gunnel 13 which forms part of the upper deck connected to the hull 14 of the transport means 12. The bracket assembly 11 is disposed so that it is detachably connected to side gunnel 13 and to the dispensing container 10 so that the dispensing container 10 is cantilevered and balanced adjacent to and spaced from the side of the hull 14. In this position the upper open end 15 of a storage compartment 16 formed in the dispensing container 10 will be easily accessible from the cockpit 17 formed in the hull 14 of the boat 10 where a suitable supply of chemicals such as copper sulfate are stored and can be charged or loaded through a charging funnel or chute 18 into the open end 15 of the storage compartment 16 in dispensing container 10, as needed, during treatment of the body of water, not shown, with such chemicals, all of which is shown in FIGS. 1, 2, 3 and 4 of the drawings.

Figure 2:
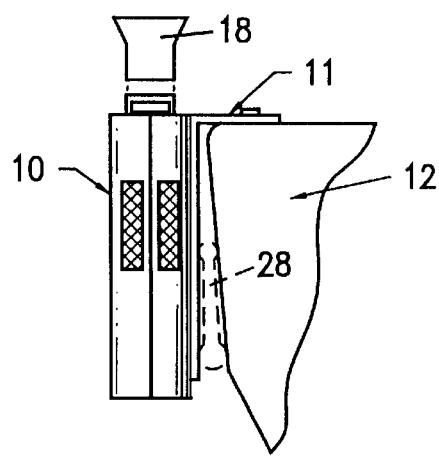
FIG. 2 is a front view of the form of the transport means with the dispensing container mounted thereon as shown in FIG. 1.
Figure 3:
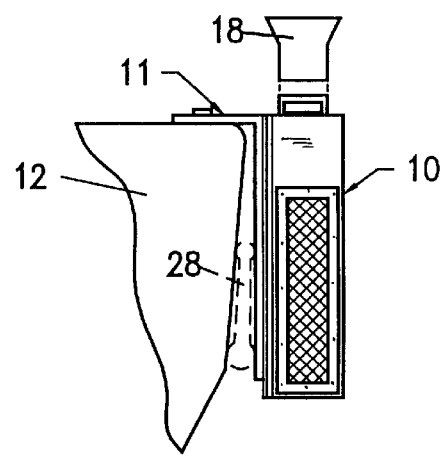
FIG. 3 is a back view of the form of transport means with the dispensing container thereon as shown in FIG. 1.

Bracket assembly 11 is made of a material such as wood, non-corrosive metal or plastic sufficiently strong to enable the bracket assembly to both support the dispensing container 10 and to be detachably connected to the transport means 12 so that the dispensing container 10 will be in the proper position to operate for the dispensing of the chemical such as copper sulfate during the treatment of the body of water, not shown. Thus, FIGS. 4, 5, 6, 7, 8 and 9 show that the bracket assembly 11 has a base plate 19 which is anchored to the side gunnel 13 by threaded means 20*a* and 20*b*. Outboard of the threaded means 20*a* and 20*b*, threaded studs as at 21*a* and 21*b* project upwardly from base plate 19 so that they will extend through coacting slots 22*a* and 22*b* in the respective horizontal legs 23*a* and 23*b* on spaced L-shaped support members 24*a* and 24*b* are in assembled position. Nuts 25*a* and 25*b* and washers 26*a* and 26*b* fit onto the threaded studs 21*a* and 21*b* and can be loosened and tightened to permit the coacting slots 22*a* and 22*b* in the respective horizontal legs 23*a* and 23*b* to be positioned or repositioned so that the vertical legs 27*a* and 27*b* of the L-shaped support members 24*a* and 24*b* which extend downwardly adjacent to the hull 14 can be moved towards and away from the hull 14 to prevent the dispensing container 10 connected thereto when in assembled position, as shown in FIGS. 1, 2 and 3 and more fully described hereinafter, from damaging the hull 14 of the transport means 12. A suitable fender 28 as shown in dotted lines at FIGS. 2 and 3 can also be provided for this purpose. The vertical legs 27*a* and 27*b* are also provided with openings as at 29*a* and 29*b* in vertical leg 27*a* and 30*a* and 30*b* in vertical leg 27*b* for connecting the dispensing container 10 to the bracket assembly 11.

Dispensing container 10 is a generally elongated rectangular box-like member made of any suitable type of corrosion resistant alloy or reinforced plastic material which may be unitarily formed or which may be fabricated to provide a first side wall 31, a second side wall 32, held in predetermined spaced relation by a V-shaped front end wall 33 and a back end wall 34 so that the joined and fabricated walls form the top 15a which defines end opening 15 at the upper end. A bottom wall 35 remote from the upper end opening 15 closes the space defined by the joined walls to form the storage compartment 16 which communicates with the open end 15 through which the chemicals such as copper sulfate stored in the transport means 12 for treating the body of water, not shown, are charged in preparing the dispensing container 10 for dispensing the chemicals for such treatment, all of which is shown in FIGS. 10, 11, 12, 13, 14, 15 and 16 of the drawings.

In order to connect the dispensing container 10 to the bracket assembly 11, FIGS. 10 to 16 also show that the dispensing container 10 is provided with transverse connecting assemblies as at 36a and 36b at the upper end of the dispensing container 10 and spaced therefrom at 36c and 36d at the lower end of the dispensing container 10. Transverse connecting assemblies 36a, 36b, 36c and 36d are identical in construction; accordingly, reference only will be made to transverse connecting assembly 36d shown in FIGS. 4, 11, 14, 15 and 16 to describe these elements for each of the respective connecting assemblies 36a, 36b, 36c and 36d.

Accordingly, connecting assembly 36d includes an elongated threaded rod 38 which has a length greater than the width of the dispensing container 10. By reason of the extra length, the elongated thread 38 can extend through transverse connecting assembly openings 39 and 40 which are in the respective first side wall 31 and second side wall 32 and in alignment with each other. Further, in assembled position a combined support and protective sleeve 41 fits about the portion of the elongated rod 38 which extends through the storage compartment 16 formed by and in the dispensing container 10. Protective sleeve 41 has a length equal to the width between the inner surfaces of the first side wall 31 and second side wall 32 which forms part of the storage compartment 16 in the dispensing container 10. Protective sleeve 41 will be made of some form of inert plastic material which will prevent the chemicals from corroding or eroding the respective elongated threaded rod 38 when it is in assembled position. Additionally, because the protective sleeves 41 for each of the respective transverse connecting assemblies fit snugly between the inner surfaces of the first side wall 31 and second side wall 32 and are spaced from each other, they also serve to increase the structural integrity of the dispensing container 10. Further, the elongated rod 28 is so sized that it extends beyond the exterior face of the respective first side wall 31 and second side wall 32 to receive threaded nuts on the respective opposite ends as at 43a and 43b to hold the entire connecting assembly 36d in assembled position on the dispensing container 10 as is shown in FIGS. 10 to 16 of the drawings.

However, the elongated rod 38 on each of the transverse connecting assemblies 36a, 36b, 36c and 36d also has a sufficient length to enable the dispensing container 10 to be mounted on the bracket assembly 11.

Figure 4:
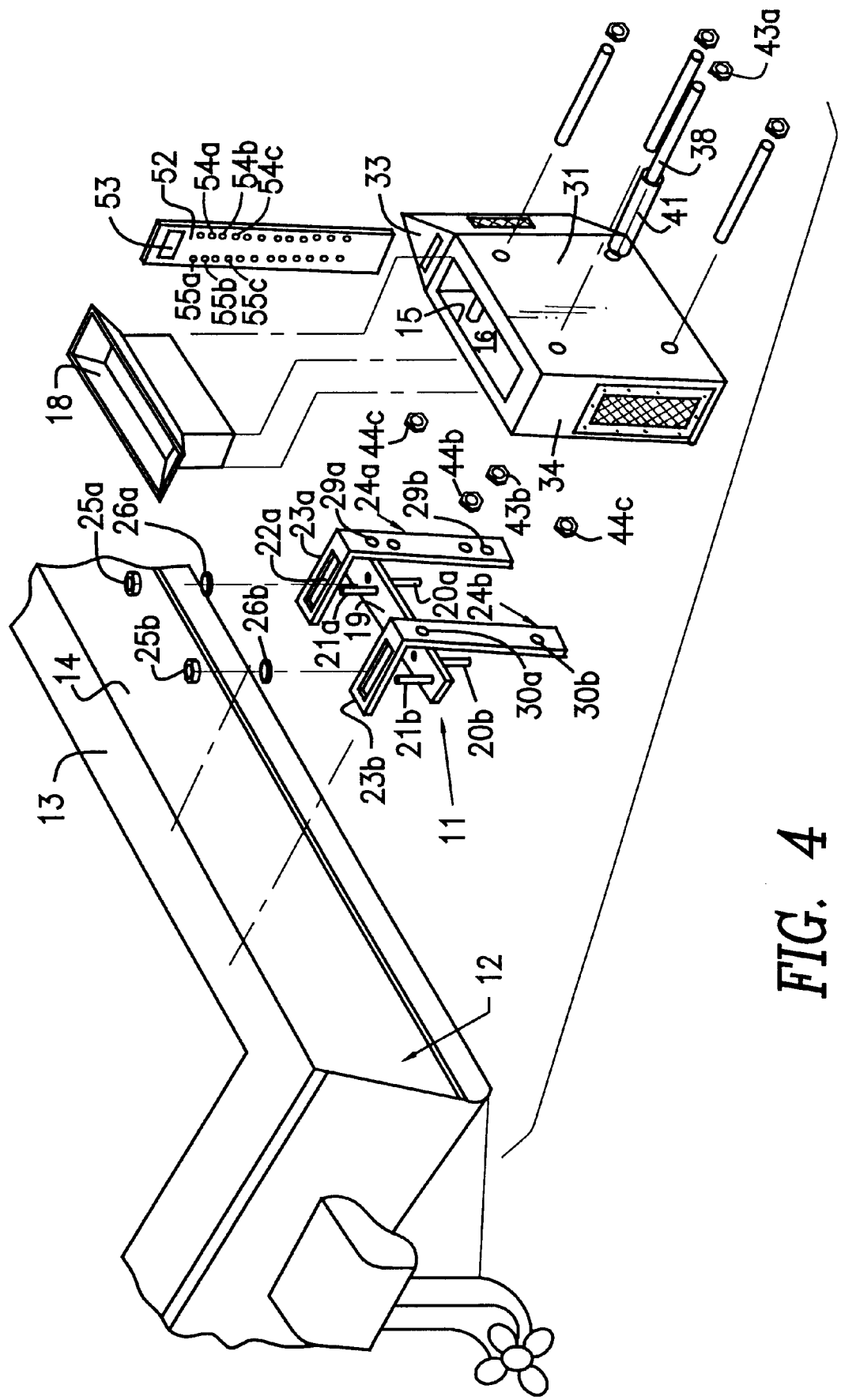
FIG. 4 is an exploded perspective view of the transport means, one form of bracket assembly for mounting the dispensing container on the transport means and an enlarged view of the dispensing container partially in vertical section.
Figure 5:
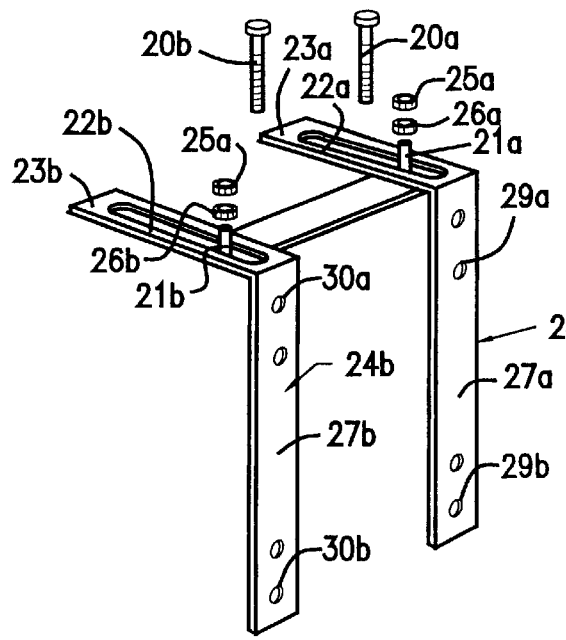
FIG. 5 is an enlarged perspective view of the of the bracket assembly for mounting the dispensing container on the transport means as shown in FIG. 4.
Figure 7:
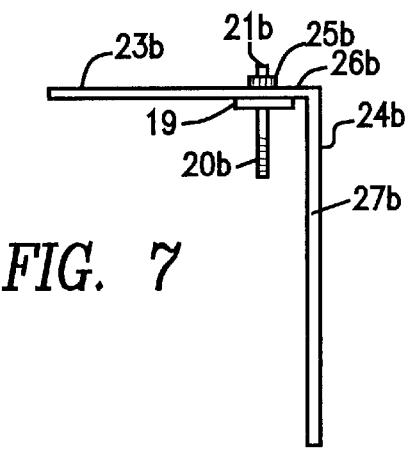
FIG. 7 is a side elevational view of the bracket assembly shown in FIG. 5.
Figure 6:
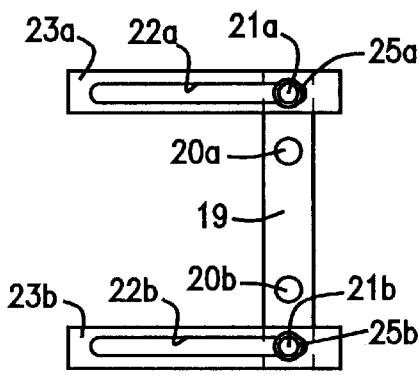
FIG. 6 is a top plan view of the bracket assembly shown in FIG. 5.
Figure 8:
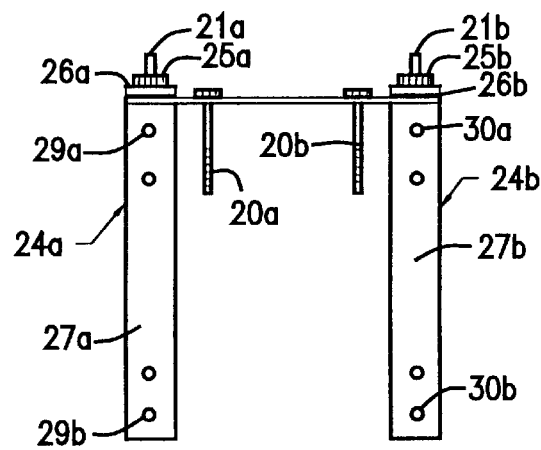
FIG. 8 is a front view of the bracket assembly shown in FIGS. 5, 6 AND 7.
Figure 9:
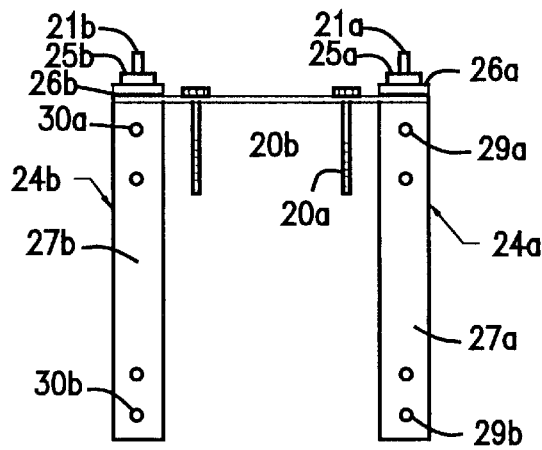
FIG. 9 is a back view of the bracket assembly shown in FIGS. 5, 6, 7 and 8.
Figure 10:
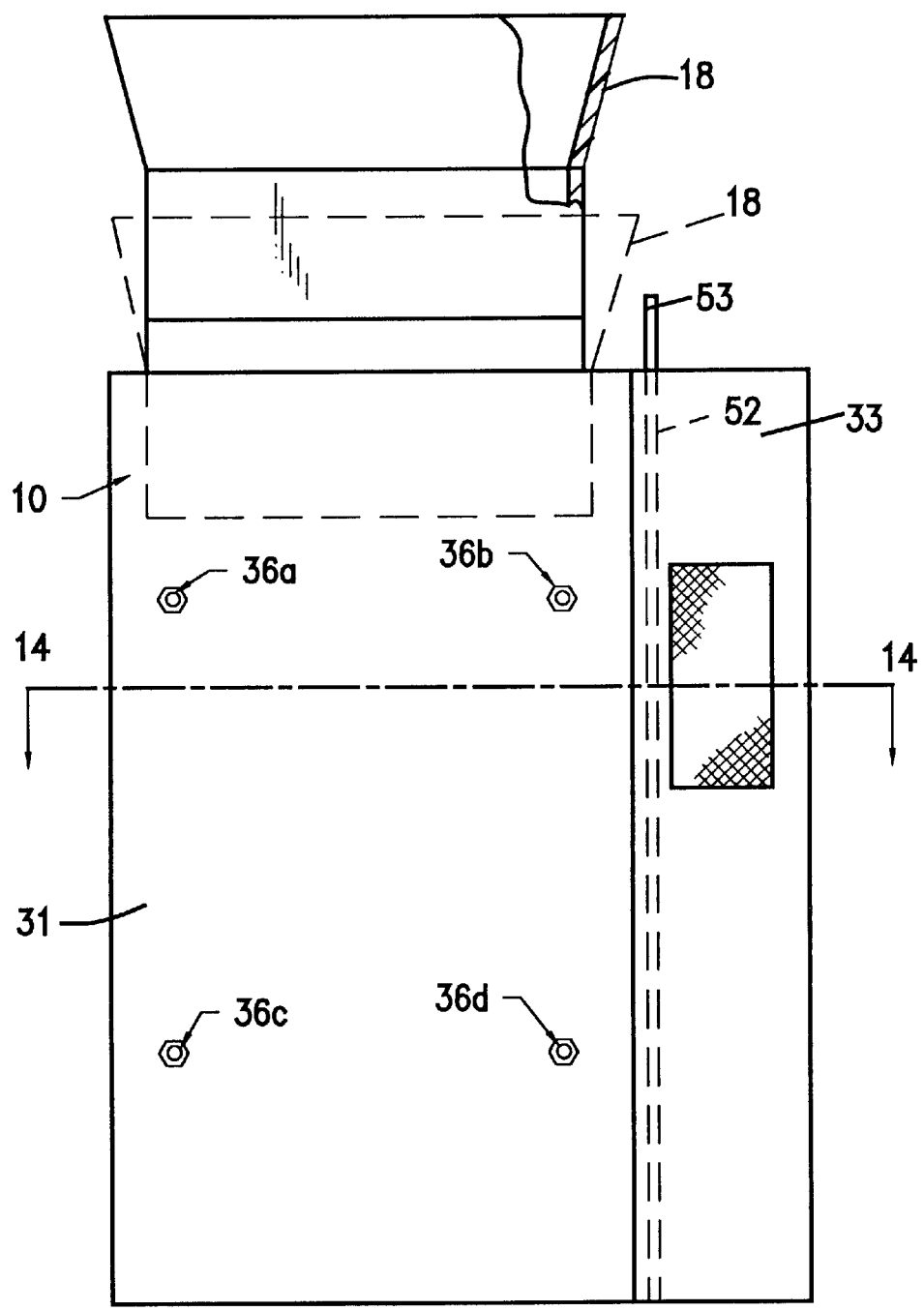
FIG. 10 is a side elevational view of the dispensing container in accordance with the present invention with one type of charging assembly for charging chemicals into the dispensing container shown in exploded position separated from the open end of the dispensing container in solid lines and in assembled position in the dispensing container in dotted lines.
Figure 11:
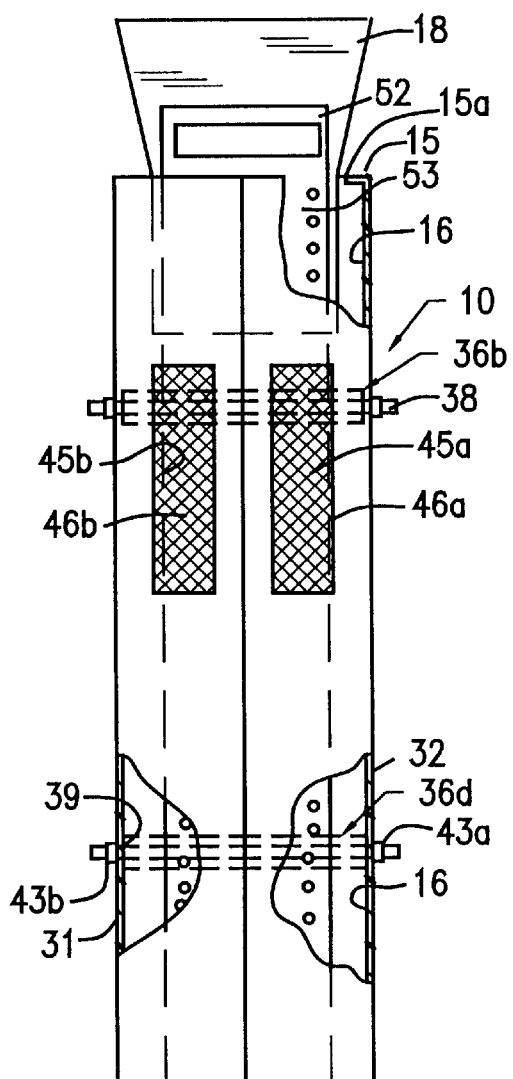
FIG. 11 is a front view of the dispensing container shown in FIG. 10, with the charging funnel in assembled position.
Figure 12:
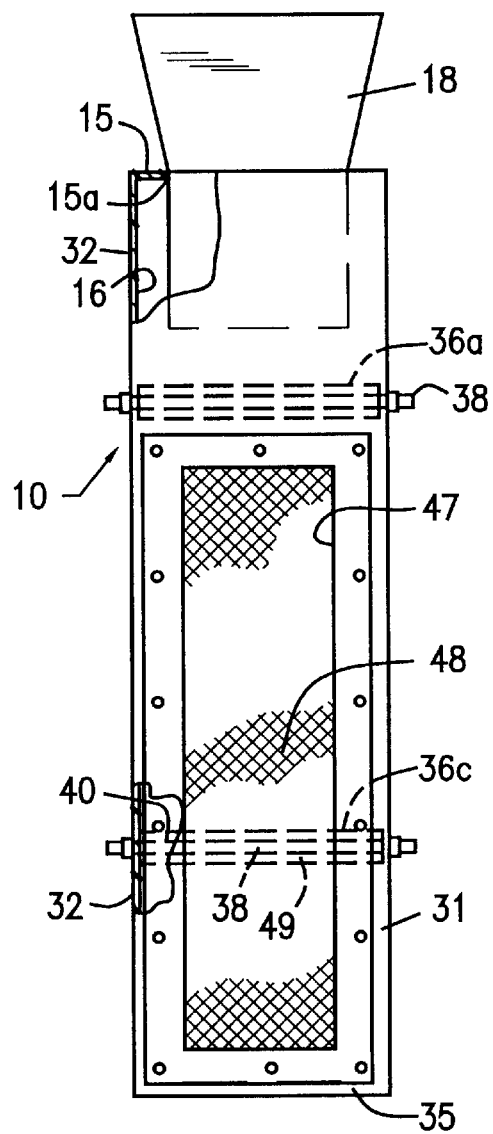
FIG. 12 is a back view of the dispensing container shown in FIGS. 10 and 11.
Figure 13:
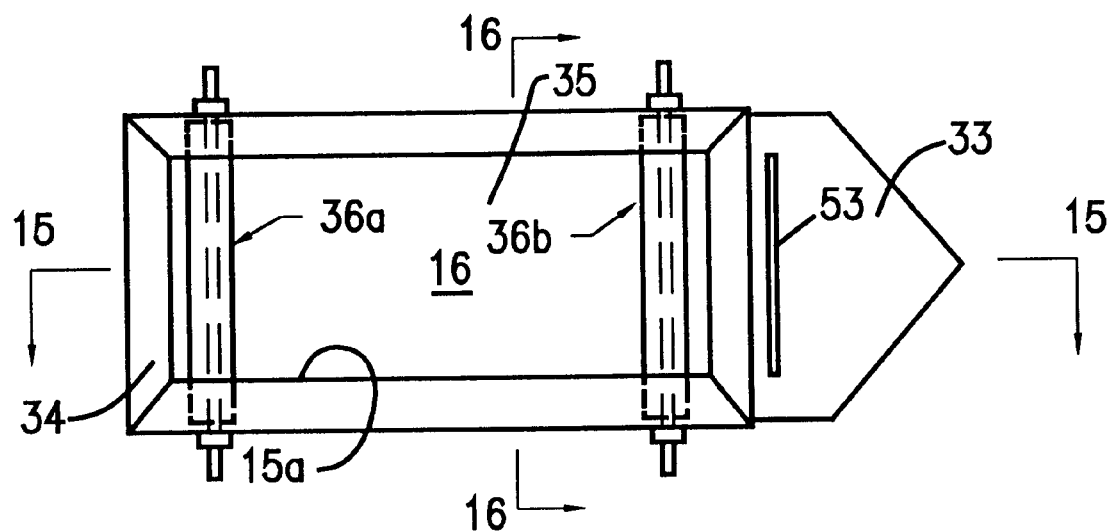
FIG. 13 is a top plan view of the dispensing container shown in FIG. 10, without the charging funnel.
Figure 14:
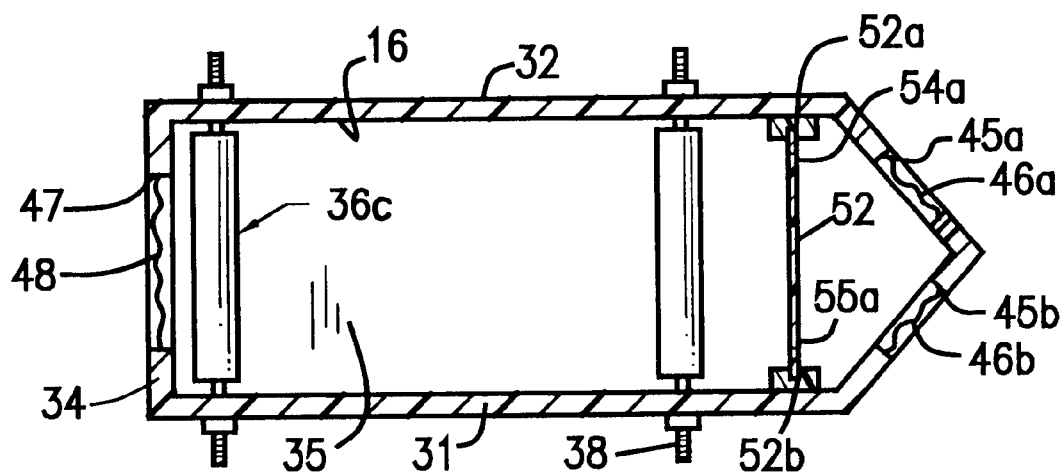
FIG. 14 is a horizontal cross-section through the dispensing container taken on line 14—14 of FIG. 10.
Figure 15:
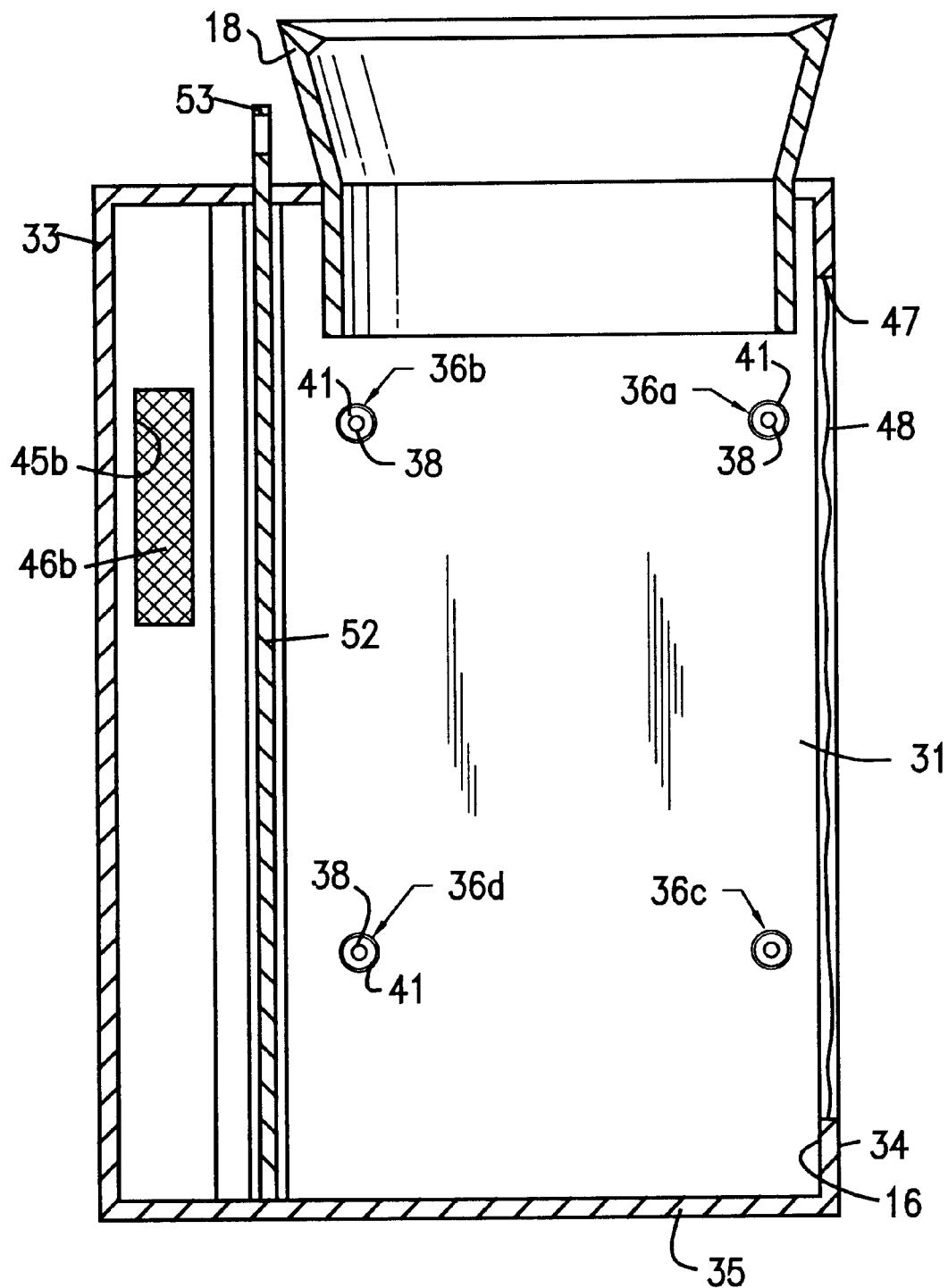
FIG. 15 is a vertical cross-section through the dispensing container taken on line 15—15 of FIG. 13.
Figure 16:
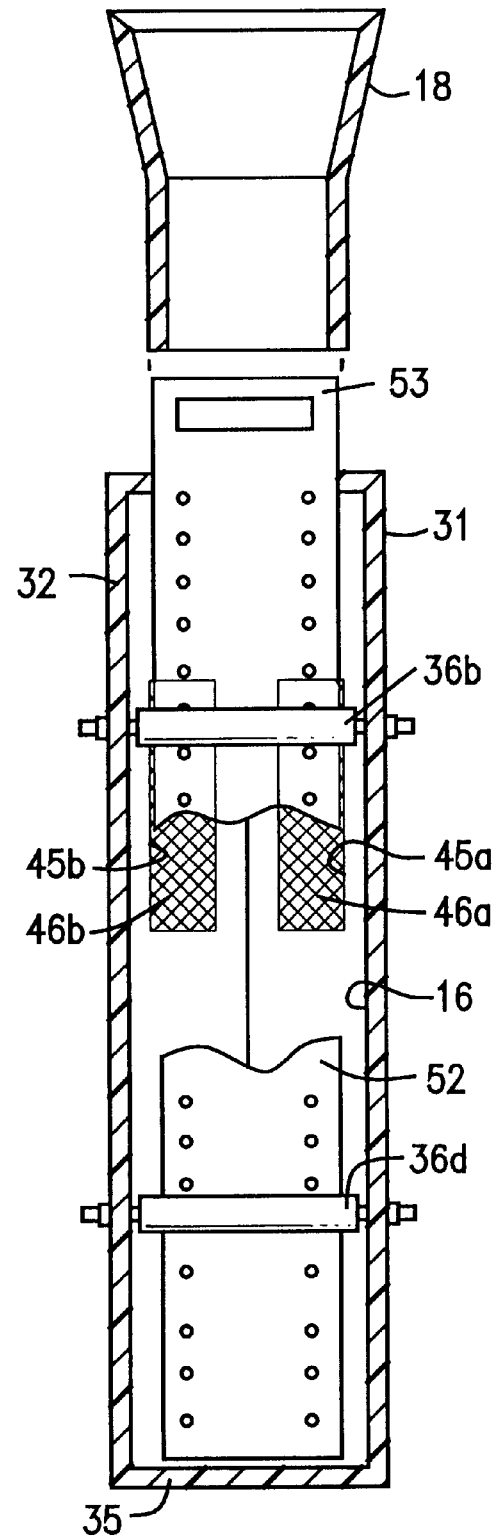
FIG. 16 is a vertical cross-section through the dispensing container taken on line 16—16 of FIG. 13.

Thus, by further reference to FIG. 4, the elongated rods 38 are shown as extending beyond the second side wall 32 of the dispensing container 10 and so spaced in assembled position that they are in alignment with and can be connected into the openings as at 29a and 30a at the upper end of the vertical legs 27a and 27b and openings 29b and 30b at the lower ends of the vertical legs 27a and 27b of the L-shaped support members 24a and 24b of bracket assembly 11, by threaded connecting nuts 44a, 44b, 44c and 44d.

The additional openings on the vertical legs 27a and 27b are to accommodate either different positions for a given dispensing container or for different sized dispensing containers, as will be understood by those skilled in the art.

It will also be noted that in fabricating the dispensing container 10, in order to control the weight and still provide the necessary support for the chemicals charged into the storage compartment 16 on the dispensing container 110 together with the water dwelling in the storage compartment 16, it has been found that the dispensing container can be fabricated out of polypropylene having a thickness of ¼" except that the top 15a about the opening 15, the bottom 35 and the second side wall 32 can be made of ⅛" polypropylene.

One of the problems in the prior art was the difficulties in controlling the rate at which the chemicals such as copper sulfate are dissolved when the treatment is in progress because of the variables such as the temperature of the water, the size of the crystals of the chemicals, the speed of the transport means, etc.

This embodiment of the invention seeks to overcome these problems first by providing means to control the volume of water flowing from the body of water being treated, not shown, through the storage compartment 16 formed in the dispensing assembly 10. Second, by utilizing sized crystals of the chemicals, such as the copper sulfate crystals, charged into the storage compartment 16 to better control the rate of dissolution of such chemicals being dissolved in the water flowing therethrough. Smaller sized crystals are preferably used because they are cheaper, and this is a further advantage to the use of the apparatus and method in accordance with the present invention. Thus, FIGS. 1, 4, 13 and 14 show that the front end 33 is V-shaped to reduce drag caused by the dispensing container 10 when the transport means 12 is moved through the body of water being treated. This front end 33 has a pair of sized and shaped inlets as at 45a and 45b in which are mounted mesh or porous members 46a and 46b. While the respective inlets 45a and 45b are shown as equal in size and shape and disposed on opposite sides of the centerline of the front end 33, those skilled in the art will recognize that this is only for purposes of illustration and that the respective inlets 45a and 45b can be different sizes, or can be on one side of the centerline of front end 33 or in fact be a single inlet without departing from the scope of the concept that the inlet means for the incoming water to the storage compartment serve as one means for controlling the volume of water which flows into the storage compartment 16.

Further, the porous members 46a and 46b mounted in the inlet openings 45a and 45b are screened or meshed materials in which the screen or mesh sizes depend on the volume of water to be delivered through the inlet openings 45a and 45b to achieve a certain rate of dissolution of the crystals of the chemical which is charged into the storage compartment 16.

The water flowing into the storage chamber 16 is passed from or flows out of the storage chamber 16 by displacement through an outlet or discharge opening 47 in which a porous member 48 is also mounted. Porous member 48 will also be made of a screen or meshed material in which the mesh size selected will permit the free unhampered discharge of the water from the storage chamber 16.

In the illustrated embodiment of the present invention, the apparatus is particularly adapted for treating reservoirs of potable water, to control the growth of algae by the application of copper sulfate. Further, by controlling the amount of water from the reservoir being treated which flows through the storage compartment 16 in the dispensing container 10, it was found that the sizing of the inlet openings 45a and 45b relative the size of the outlet opening 47 that the dissolution rate of the copper sulfate permitted the use of the smaller size crystals of copper sulfate which are cheaper than the large size crystals heretofore used in the prior art burlap bag method of treating such reservoirs as above described.

Thus, referring to Table A, the control of water flow through the storage compartment 16 by sizing the inlet opening and outlet opening is illustrated as follows:

TABLE A

| Size of Inlet Opening | Size of Outlet opening | Mesh (100 gm) Size | CuSo$_4$ | (Minutes) Rt. of Diss. |
|---|---|---|---|---|
| (2) 2½" × 6¾" | (1) 4" × 16" | #40 | Small | 23 |
| | | | Granular | 11 |
| | | | Macro | 6 |
| | | | Powdered (Diamond) | 2 |

Table A shows that the dissolution rate is a function of the size of the CuSo$_4$ crystals charged into the storage compartment 16 of the dispensing chamber 10.

Simply put, if the crystal size is reduced, less water will be allowed to enter the storage compartment. Another method of controlling the concentration is to regulate the speed of the transport means 12.

Still another technique for controlling the volume of water passing through and dwelling in the storage compartment 16 is to select predetermined mesh sizes for the screens in the inlet openings 45a and 45b and the outlet openings 47 as may be needed for a given body of water being treated. The mesh sizes can be in a range from #20 mesh to #60 mesh and preferably about #40 mesh.

Last, FIGS. 4, 11, 13, 14, 15 and 16 show that the dispensing container 10 also includes a baffle assembly as at 49 for starting and stopping the flow of water from the body of water being treated into the storage chamber 16. Baffle assembly 47 has a simple vertical flat thin slat like member 50 which is slidably mounted through a slot 52 in the front end wall 33 and vertical grooves as at 52a and 52b on the respective opposite inside surfaces of the front end wall 33 adjacent to the first side wall 31 and second side wall 32. The vertical slat 50 has a length greater than the vertical length of the front end wall 33 so it extends to the exterior of the dispensing container 10 on which a handle 53 is formed to enable the vertical slat member 50 to be manually moved by sliding it into and out of assembled position. When the vertical slat member 50 is in assembled position, it lies behind the inlets 45a and 45b and acts to occlude or stop the water entering through the inlets 45a and 45b from flowing into the storage chamber 16. Conversely, when the vertical slat 50 is grasped by the handle 53 and removed from assembled position, the water entering through the inlets 45a and 45b can then flow into the storage compartment 16, all of which is clearly shown in FIGS. 4, 10, 11, 13, 14, 15 and 16 of the drawings.

The vertical slat 50 has a plurality of openings or holes along the vertical length thereof at 54a, 54b, 542c, etc. on the right-hand side and 55a, 55b, 55c, etc. on the left-hand side to prevent excessive drag on the transport means 12 when the vertical slat 50 is in position to occlude or stop the flow of water from entering the storage compartment 16.

In operation, the dispensing container is connected to the transport means 12 by the bracket assembly as above described with the baffle assembly 48 in position to prevent flow of water into the storage compartment 16. Cockpit 17 of the transport means 12 is filled with the chemical such as copper sulfate in the crystalline size for the particular application and treatment requirements. Charging funnel or chute 18 is positioned in the end opening 15 of the dispensing container 10, and the chemical is charged into the storage compartment 16. The transport means 12 can now be propelled into the body of water, not shown, to be treated.

As the transport means 12 moves through the body of water, the vertical slat 50 can be removed from assembled position by grasping the handle 53 and sliding the vertical slat upwardly to clear the inlets 45a and 45b, and this enables water entering through these inlets to flow into the storage compartment 16 where the chemicals will be dissolved and then discharged by displacement flowing out of the dispensing container 10 through the outlet 47 into the body of water being treated where it can act to correct the adverse condition being treated in the body of water.

Thus, one apparatus and method for the treatment of an adverse condition in a body of water such as a reservoir has been shown and described. It will be understood, however, that the invention is not to be limited to the specific construction or arrangement of parts shown but that they may be widely modified within the invention defined by the claims.

What is claimed is:

1. Dispensing container means made of a corrosion-resistant material to hold chemical for controlled dissolution of the chemicals into a body of water comprising:
   a. storage compartment means having an open end for receiving the chemicals to be dispensed into the body of water,
   b. said storage compartment means including, wall means having predetermined sized openings to permit fluid to pass into and out of the storage compartment means and to control the rate of flow and the dwell time of such fluid through the storage compartment,
   c. said storage compartment means operatively connectable to a transport means for passing the storage compartment means through the body of water to bring the dissolved chemicals into contact with the water in said body of water,
   d. the predetermined sized openings in the wall means includes:
      i. an inlet opening having a predetermined sized mesh means therein,
      ii. an outlet opening having a predetermined sized mesh means therein,
      iii. said inlet opening smaller in size than the outlet opening to control the volume of water passing into and out of said storage compartment means, and
      iv. said mesh means in the respective inlet opening and outlet opening in a range from #20 to #60.

2. Dispensing container means made of a corrosion-resistant material to hold chemical for controlled dissolution of the chemicals into a body of water comprising:
   a. storage compartment means having an open end for receiving the chemicals to be dispensed into the body of water,
   b. said storage compartment means including, wall means having predetermined sized openings to permit fluid to pass into and out of the storage compartment means and to control the rate of flow and the dwell time of such fluid through the storage compartment, c. said storage compartment means operatively connectable to a transport means for passing the storage compartment means through the body of water to bring the dissolved chemicals into contact with the water in said body of water, d. said storage compartment wall means defines a front wall means, and a back wall means, e. said front wall means having inlet means with sized mesh means therein for passing water into the storage compartment means, and f. said back wall means having an outlet means with sized mesh means to create a predetermined back pressure to control the rate of flow of water passing out of said storage compartment means.

3. In the dispensing container in claim 1 or 2 including, means to stop and start the flow of water into the storage compartment means.

4. In the dispensing container in claim 1 or 2 wherein the corrosive-resistant material is polyethylene.

5. In the dispensing container in claim 1 or 2 wherein the dispensing container is fabricated from a plastic material and includes a top wall and side walls, and said top wall having a thickness of about 1/8" and said side walls having a thickness of about 1/4".

6. In the dispensing container in claim 1 or 2 including, charging means for charging the chemicals through the open end into the storage compartment means.

7. In the dispensing container in claim 1 or 2 including:
   (a) charging means for charging the chemicals through the open end into the storage compartment means, said charging means made of plastic and having:
      i. a sized inlet opening,
      ii. a sized discharge outlet, and
      iii. said discharge outlet sized to fit into the open end of the storage compartment.

8. In the dispensing container in claims 1 or 2 wherein:
   a. said storage compartment means has a first side wall means and a second side wall means, and
   b. spaced transverse connecting means disposed between said first side wall means and said second side wall means including, threaded means for each of said transverse connecting means, and protective sleeves about each of said threaded means to protect the threaded means from corrosion.

9. In the dispensing container in claims 1 or 2 wherein:
   a. said storage compartment means has a first side wall means and a second side wall means,
   b. spaced transverse connecting means disposed between said first side wall means and said second side wall means including, threaded means for each of said transverse connecting means, and protective sleeves about each of said threaded means to protect the threaded means from corrosion, and
   c. said protective sleeves disposed in assembled position between the inner faces of the respective first side wall and second side wall to maintain the structural integrity of the dispensing container.

10. In the dispensing container in claim 1 wherein the means to stop and start the flow of water into the storage compartment comprises:

a. spaced guide means on the wall means in alignment with each other and operatively disposed relative at least one of the predetermined sized openings and the storage compartment, and b. baffle means slidably mounted in the spaced guide means and movable from a position to normally maintain the associated opening in a closed position movable to an open position and vice versa to control the flow of water into the storage compartment.

11. In the dispensing container in claim 10 wherein the baffle means extends to the exterior of the dispensing container, and a handle on the portion of the baffle means exterior of the dispensing container for moving of the baffle means from closed to open position.

12. The combination with a transport means for traversing a body of water requiring chemical treatment to prevent the growth of algae or other adverse conditions of:

a. a dispensing container defining, storage compartment means for holding the chemicals to be applied to the body of water, b. said storage compartment means includes, wall means defining, front wall means and back wall means, c. said front wall means having sized inlet means for controlling the volume of water flowing into the storage compartment means, d. said back wall means having sized outlet means for the discharge of water out of the storage compartment means to control the rate of flow and the dwell time of the water in the storage compartment, and e. means for connecting the dispensing container to said transport means.

13. In the combination as in claim 12 wherein, said dispensing container is shaped and sized to position the storage compartment so that water will pass therethrough when the transport means is moved through the body of water being treated.

14. The combination with a transport means for traversing a body of water requiring chemical treatment to prevent the growth of algae or other adverse conditions of:

a. a dispensing container defining, storage compartment means for holding the chemicals to be applied to the body of water, b. said storage compartment means includes, wall means defining, front wall means and back wall means, c. said front wall means having sized inlet means for controlling the volume of water flowing into the storage compartment means, and d. said back wall means having sized outlet means for the discharge of water out of the storage compartment means to control the rate of flow and the dwell time of the water in the storage compartment, and e. means for connecting the dispensing container to the transport means including:
      i. bracket means having, means at one end for connecting the bracket means to the transport means, and means at the opposite end for connecting the bracket means to the dispensing container, and
      ii. a bumper means spaced and disposed relative the dispensing container to prevent damage during movement of the transport means when the dispensing container is connected in assembled position.

\* \* \* \* \*